United States Patent
Hay

(10) Patent No.: US 9,420,855 B2
(45) Date of Patent: Aug. 23, 2016

(54) METHOD, DEVICE, AND SYSTEM FOR ASSEMBLING RARE-EARTH MAGNETS IN A NOVELTY BUTTON

(71) Applicant: Scott Hay, Portland, OR (US)

(72) Inventor: Scott Hay, Portland, OR (US)

(*) Notice: Subject to any disclaimer, the term of this patent is extended or adjusted under 35 U.S.C. 154(b) by 168 days.

(21) Appl. No.: 14/488,950

(22) Filed: Sep. 17, 2014

(65) Prior Publication Data

US 2015/0075329 A1    Mar. 19, 2015

Related U.S. Application Data

(60) Provisional application No. 61/879,575, filed on Sep. 18, 2013.

(51) Int. Cl.
| | |
|---|---|
| *B21D 53/48* | (2006.01) |
| *A44C 3/00* | (2006.01) |
| *B65G 59/10* | (2006.01) |
| *B21D 43/14* | (2006.01) |
| *H01F 7/02* | (2006.01) |

(52) U.S. Cl.
CPC .............. *A44C 3/001* (2013.01); *B21D 43/14* (2013.01); *B21D 53/48* (2013.01); *B65G 59/107* (2013.01); *H01F 7/0221* (2013.01); *A44D 2203/00* (2013.01); *Y10T 29/13* (2015.01)

(58) Field of Classification Search
CPC .. A44D 2203/00; A44C 3/001; H01F 7/0221; B21D 43/14; B21D 53/48; Y10T 29/13; Y10T 29/49828; Y10T 29/49829; Y10T 29/5128; Y10T 29/5136; Y10T 29/5152; B65G 59/107; B65G 59/108
USPC ............... 79/1, 3, 4, 18; 414/797.4, 797.7; 221/222
See application file for complete search history.

(56) References Cited

U.S. PATENT DOCUMENTS

| | | | | |
|---|---|---|---|---|
| 2,348,441 | A | * 5/1944 | Walker | A41H 37/10 24/94 |
| 3,960,257 | A | * 6/1976 | High | B44B 5/024 101/4 |
| 4,236,331 | A | * 12/1980 | Mattson | G09F 7/00 40/1.5 |
| 4,299,019 | A | 11/1981 | Roebuck | |
| 4,829,662 | A | 5/1989 | Braunberger | |
| 4,835,843 | A | 6/1989 | Wendt et al. | |
| 4,867,013 | A | 9/1989 | Braunberger | |
| 5,301,402 | A | * 4/1994 | Noel | B21D 53/48 269/21 |
| 5,327,623 | A | * 7/1994 | Noel | A41H 37/10 269/21 |
| 6,038,944 | A | 3/2000 | Braunberger | |
| 6,393,686 | B1 | 5/2002 | Braunberger | |
| 6,431,027 | B1 | 8/2002 | Braunberger | |
| 6,723,447 | B1 | 4/2004 | Braunberger | |
| 6,938,518 | B1 | 9/2005 | Braunberger | |
| 7,509,891 | B2 | 3/2009 | Miyake et al. | |
| 7,523,540 | B2 | * 4/2009 | Morel | H02K 15/03 29/423 |

\* cited by examiner

*Primary Examiner* — Edward Tolan

(74) *Attorney, Agent, or Firm* — Mohr Intellectual Property Law Solutions, PC

(57) ABSTRACT

A system for assembling a novelty button having a magnet inserted between the back cover and the front plate includes a first rotary table of a non-ferrous material having one or more receiving cups. Each receiving cup is sized to receive one magnet from a vertical stack of magnets. A stationary, non-ferrous shearing removes a bottommost magnet from the stack when the first table rotates. A second rotary table made from a non-ferrous material having at least one non-ferrous lower die fixture receives a subassembly consisting of a back cover and a magnet arranged on interior face of the back cover. A modified button press having a non-ferrous upper die set crimps a front plate to the back cover.

5 Claims, 7 Drawing Sheets

METHOD, DEVICE, AND SYSTEM FOR ASSEMBLING RARE-EARTH MAGNETS IN A NOVELTY BUTTON

PRIORITY CLAIM

The present application claims benefit under 35 USC Section 119(e) of U.S. Provisional Patent Application Ser. No. 61/879,575, filed on Sep. 18, 2013: The present application is based on and claims priority from this application, the disclosures of which is hereby expressly incorporated herein by reference.

FIELD OF THE INVENTION

The present invention relates to devices, systems, and methods for manufacturing a novelty button having a rare-earth magnet. More specifically, the present invention relates to a device with a rotary table adapted to place a rare-earth magnet between a bottom metal layer and a top layer of a novelty button.

BACKGROUND

Novelty buttons traditionally include an image, slogan, or other artwork displayed on a top layer, some of which are covered by a transparent cover, and mounted to a backing plate. Some novelty buttons include a pin member on the back cover, which enables the button to be selectively coupled to an article of clothing, for example. Further, this back cover is typically a non-ferrous material and includes a mechanical pin device for selectively coupling the backing to a clothing item of a wearer.

Other traditional novelty buttons use a man-made magnetic material as a backing layer to support the artwork, image, or slogan. The man-made magnetic material enables the button to be mounted to a metal object, such as a refrigerator or the like. The man-made magnets are typically selected for ease and efficiency in manufacturing. The man-made magnetic material usually is fabricated in a large, flat sheet. An optional adhesive layer may be included. The sheet, then, is cut to the desired dimension and the desired artwork is adhered to the sheet. This results in a very low-cost-to-manufacture novelty button, but often results in inferior quality in terms of both long-term preservation of the artwork incorporated in the novelty button and in the magnetic attraction of the man-made magnet, which degrades remarkably over a short period of time, and further, has a relatively weak magnetic charge to begin with.

Despite the much greater magnetic strength of rare-earth magnets, the current teaching in the art instructs away from using the rare-earth magnet in novelty buttons. Traditional novelty buttons are either of the pin variety or are of the sheet, man-made magnet variety and are not typically made with rare-earth magnets. Rare-earth magnets are difficult to assemble into novelty buttons. In part this difficulty is because the magnetic properties of rare-earth magnets make traditional (hand or machine) assembly difficult due to both the ferrous nature of the back cover commonly used and that the press and die sets used to assemble the cover and back cover are steel. Thus, there is an ever-difficult problem of inserting a magnet between the outer layers (front and back covers).

Moreover, traditionally, a labor-intensive, manual operation is used to insert a magnet. In other known instances, a synthetic magnet having an adhesive backing is used to adhere the magnetic material to an exterior face of one of the outer layers. Both these methods are undesirable for aesthetic, cost, quality, and efficiency reasons. Further, man-made magnets do not have the same magnetic density as rare-earth magnets; this results in inferior magnetic attraction between the novelty button and the desired mounting surface (i.e., refrigerator or locker).

Most common in this art and more traditional, novelty buttons include a pin assembly in lieu of a magnet. The pin assembly arranges on the exterior side of the back (or bottom or rear) cover (a back face of the backing plate) using well known-in-the-art methods and configurations. A pin-equipped novelty button typically does not include a magnet (man-made or rare-earth): Instead, the pin button simply attaches to an article of clothing of the wearer, as would be well understood by those skilled in this art.

The prior art has overcome many difficulties in assembling a pin to the back cover of a novelty button. In contrast, however, the assembly of a magnetic material to a novelty button creates its own problems. Because of the nature of magnetic material, assembling magnets to novelty buttons is problematic as the magnetic material magnetically attracts individual magnets to one-another. And, the magnets are also attracted to the steel used in the die tools, assembly presses, and to the steel or other ferrous materials used in the manufacturing process. To overcome these problems, the prior art instructs using man-made magnets—such as the ceramic or flexible magnets—which come in the form of a large sheet with one side pre-assembled with an adhesive and a protective sheet. The large sheet is then cut to size and a hand assembly operation removes the protective sheet from the individual-cut magnet, and then adheres that individual magnet to the exterior back surface of the novelty button after final assembly of the front cover to the back cover and after the artwork is applied to the front cover. This hand-assembly operation is costly, inefficient, and creates variability on the placement of the magnet to the visible back surface of the novelty button, which results in poor-quality. Further, the relative low-magnetic force of the man-made magnet is less desirable. This prior-art approach further requires that the novelty button be already assembled, as the magnet material interferes with the pressing operation used to assemble the standard components of the novelty button. Thus, there remains a need for a method and device that allows a magnetic material to be assembled between the front and back covers during assembly.

To better appreciate the teaching in the prior art of assembling a novelty button, U.S. Pat. No. 4,299,019 issued on Nov. 10, 1981 to Roebuck describes a die-set combination for making pin-back badges. The entire disclosure of which is hereby incorporated by reference as if fully set out herein.

Automating this process has also been described in the prior art. U.S. Pat. No. 4,835,843 issued on Oct. 6, 1989 to Wendt et al. describes an automatic badge-making machine. Yet another apparatus for manufacturing buttons is described in U.S. Pat. No. 6,038,944 issued on Mar. 21, 2000 to Braunberger. And another device, a two-stroke machine for making buttons having coplanar shell flanges, is described in U.S. Pat. No. 6,938,518 issued on Sep. 6, 2005 to Braunberger. And, U.S. Pat. No. 7,509,891 issued Mar. 31, 2009 to Myake et al. describes a button-making device, a button, and a method of mounting a pressing mold in the button-making device. The entire disclosures of which are hereby incorporated by reference as if fully set out herein.

Yet another illustrative example of the known art includes a "Two-Stroke Machine for Making Buttons Having Coplanar Shell Flanges" as described by Braunberger in U.S. Pat. No. 6,938,518. The entire disclosure of which is hereby incorporated by reference as if fully set out herein.

Other known and relevant prior art references are fully disclosed in the accompanying information disclosure statement and each reference cited therein is hereby incorporated by reference as if fully set out herein.

Each of the aforementioned devices does not contemplate incorporating a permanent magnet in a novelty button. More specifically, there has yet been a viable solution to introduce a magnet, such as a rare-earth (permanent) magnet between the front and back covers during assembly of the components used to make a novelty button. Accordingly, the unique issues arising from assembly a permanent magnet on an interior portion of a novelty button have not been addressed, contemplated, nor solved by the known art.

Therefore, there remains a need for a system, device, and method that more efficiently enables the insertion of a rare-earth magnet on an interior portion of a novelty button.

DRAWING

DESCRIPTION OF THE INVENTION

Figure 1:
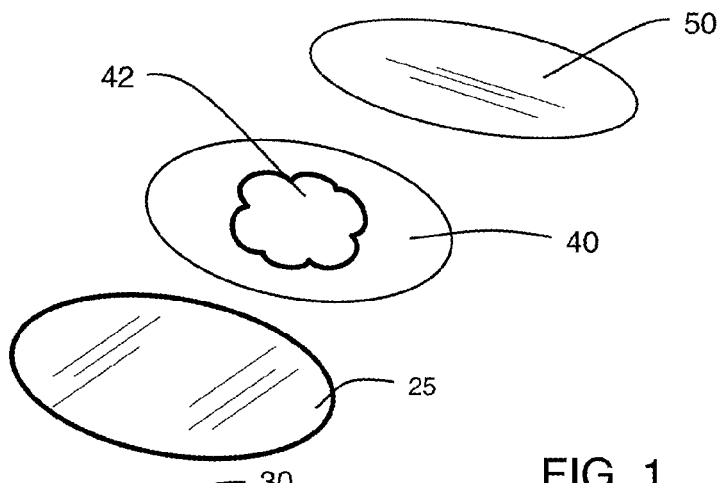
FIG. 1 is an exploded view of a novelty button having a permanent magnet according to one preferred embodiment of the present invention.
Figure 2:
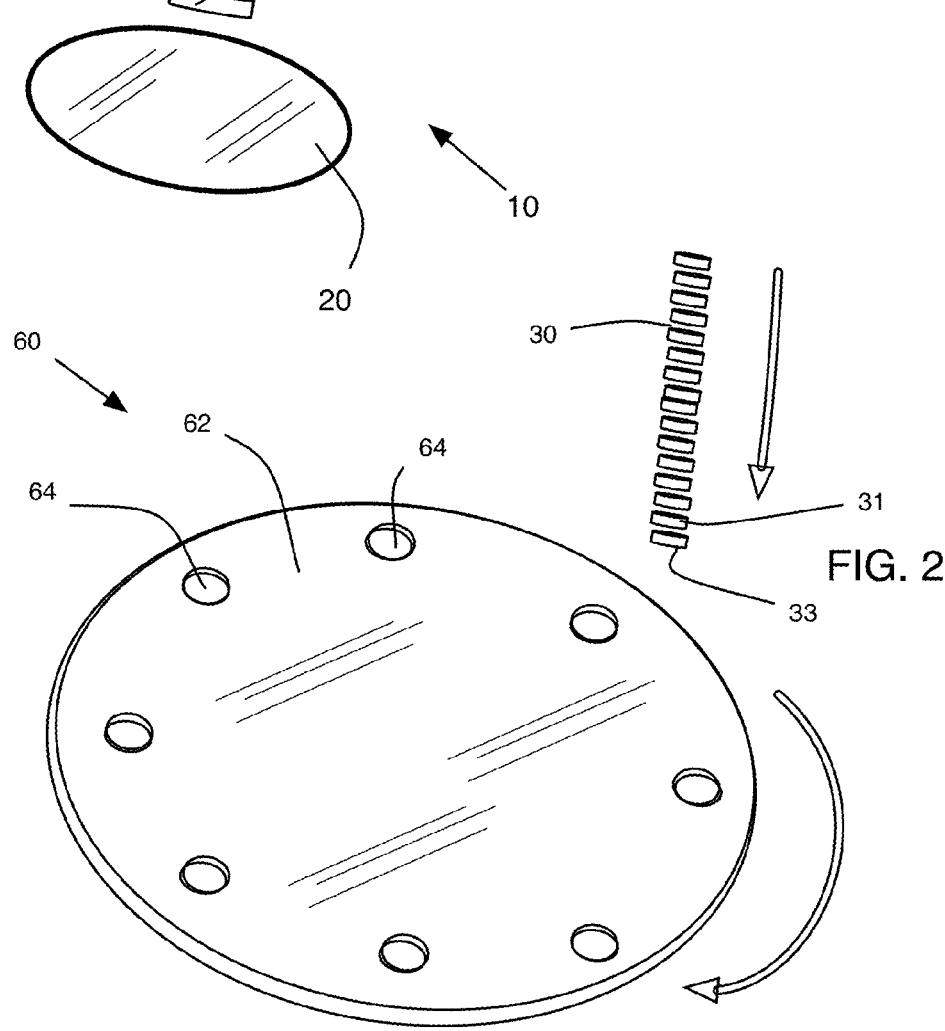
FIG. 2 is an offset frontal view of certain components of a device for separating permanent magnets used in the assembly of the novelty button of FIG. 1.
Figure 3:
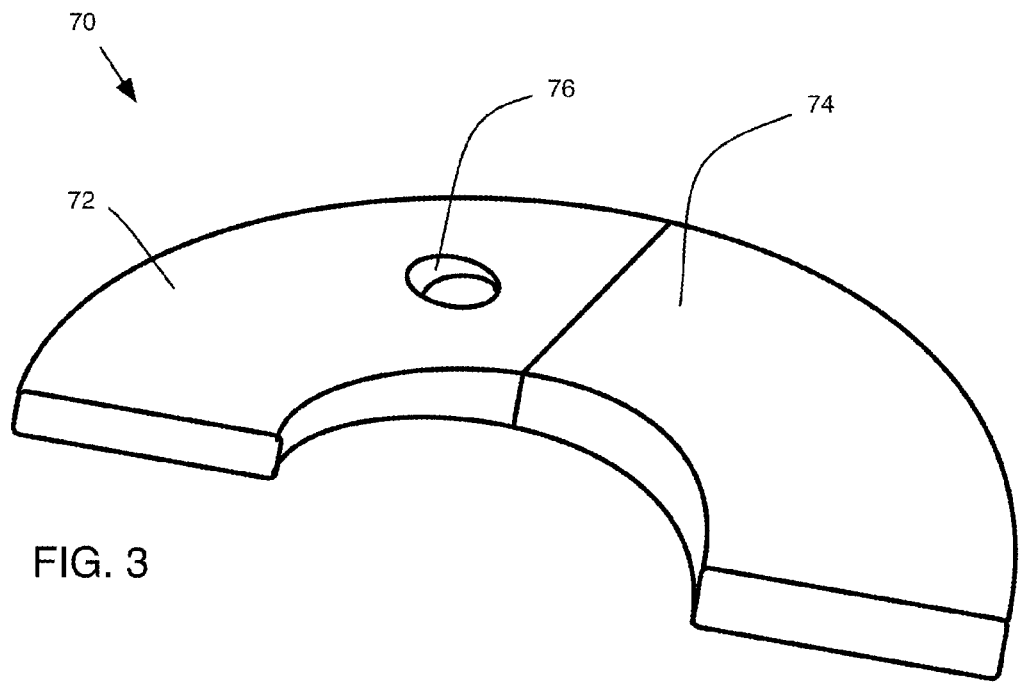
FIG. 3 is an offset frontal view of additional components used in conjunction with the components of FIG. 2.
Figure 4:
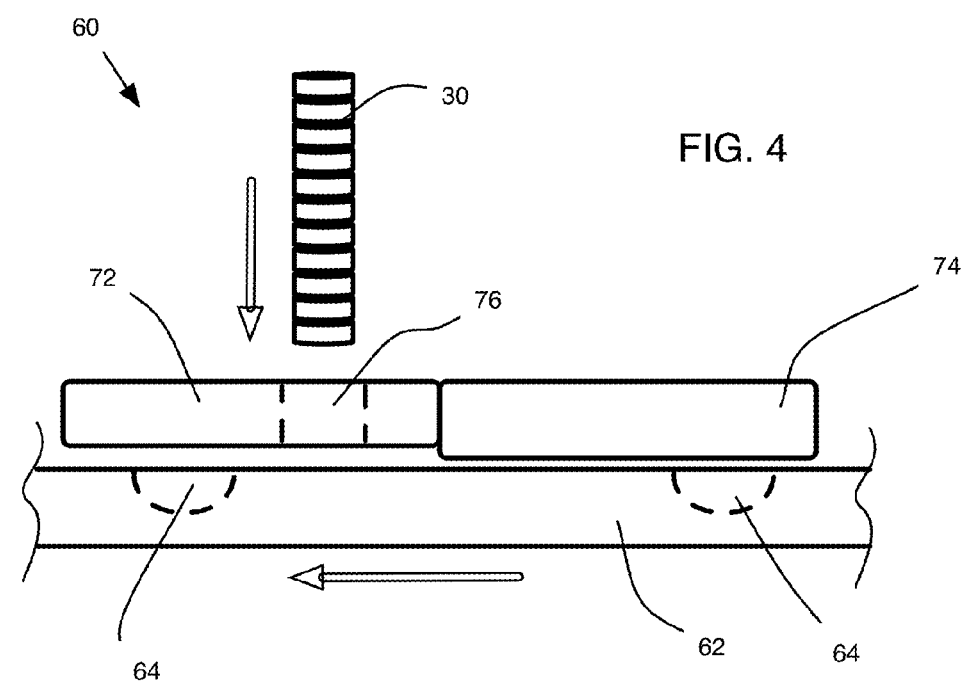
FIG. 4 is a partial view of a side view of a device for separating permanent magnets according to a preferred embodiment of the present invention.

Those skilled in the art will appreciate the assembly of traditional, pin-backed, novelty buttons and the novelty buttons of the present invention share many similarities in terminology, construction, components, assembly, and use. One important distinction; the novelty button of the present invention includes a rare-earth magnet in the center (between the metal front plate and the back cover) and omits the traditional pin assembly from the back cover. In the present invention, this magnet is invisible to the end assembly, but enables the novelty pin to adhere to ferrous materials, such as a refrigerator, locker, or lamp, as might be found in the office or home of the user of such a novelty button. This use differs from the pin-backed novelty button, which is typically worn on the lapel or other clothing item. Accordingly, the present invention includes methods, device, and a system for inserting a rare-earth (permanent) magnet during assembly of a novelty pin. The magnet arranges between the front plate and the back cover of a novelty button. And, as would be understood, the artwork layer arranges on top of the front plate and under a protective cover.

But first, a brief overview of a traditional, pin-backed novelty button will aid the reader, particularly, in relation to a typical assembly method of such a traditional (pin-backed) novelty button. Then, comparisons to the current invention's method and device and systems can be more readily appreciated.

Conventionally, a pin-backed novelty button consists of a front cover assembly that includes a clear protective cover layer, an artwork layer, and a metal front plate. The front cover assembly has a substantially circular front surface and, particularly, the front plate includes a peripheral edge. The conventional pin-backed novelty button further includes a back cover having a substantially circular back surface plate with a peripheral edge.

The front plate engages with the back cover to form a button shell. Specifically, the front plate and back cover are placed in a die set so that their corresponding and respective peripheral edges are bent and folded over each other so that the peripheral edge of the back cover and the peripheral edge of the front cover come into contact. The front cover and the back cover are fabricated from a malleable material, for example tin, or other alloys of steel, which is commonly used in this art and would be well-understood by those having ordinary skill.

An artwork layer arranges on top of the front plate. The artwork layer consists of an image, slogan, picture, graphic, or combination of such elements, is printed, transferred, painted, silk-screened, or otherwise generated on a piece of paper or similar material and cut to a predetermined size and shape.

A front cover overlays the artwork layer. The front cover typically consists of a thin transparent synthetic resin, such as Mylar or other similar transparent plastic material.

A button body is made by overlapping the clear front cover and artwork layer over the front plate and assembling that to the back cover by bending the peripheral edge of the front plate so that the peripheries of the cover and artwork layer are gripped between the peripheral edge of the front plate and the peripheral edge of the back cover.

Typically, a button-making device crimps the front plate and back covers together by over-folding the corresponding peripheral edges. Then, a safety pin, or similar pin-assembly is attached to the button body on the back, exposed face on the back cover. In some examples, the pin is inserted prior to the crimping operation. But commonly, the pin may is attached by an adhesive, or bonded by welding, or other similar added assembly operation, as would be well appreciated by those skilled in the art.

A finished, traditional, pin-backed button has a three-dimensional appearance that enhances the visual appeal of the artwork and enhances the overall quality of the button.

One example of a device well-suited for creating a conventional novelty button as just described above is disclosed by Miyake et al. in U.S. Pat. No. 7,509,891 issued on Mar. 31, 2009 and the entire disclosure is hereby incorporated by reference as if fully set out herein.

With this background of conventional novelty buttons now completed, above, the present invention in its various contemplated, possible, and preferred embodiments will now be described with reference to the drawings: Those skilled in the art will understand that alternative configurations and combinations of components may be substituted without subtracting from the invention. Also, in some figures certain components are omitted to more clearly illustrate the invention.

For the purposes of this invention, the term "novelty button" is used to describe a multi-component assembly illustrated, for example, in FIG. 1. The novelty button includes a cover layer consisting of a flexible laminate or a protective transparent film, an artwork layer—which normally includes a pre-cut sheet of paper with pre-printed or silk-screened art, design, slogan, and the like thereon—and a front plate. Further, the front plate assembles to a back cover. However, the present invention, prior to forming the button shell (which consists of the overfolded front plate and back cover, as discussed above in relation to traditional pin-backed novelty buttons), includes a rare earth (permanent) magnet inserted inside the button shell between the front plate and back cover.

In some preferred embodiments, the artwork layer and the cover layer are separate layers but it not necessary that the artwork and transparent film cover layer be bonded to each other. In other preferred and contemplated embodiments the artwork and cover layer need not be separate elements. Further, as used in the context of the present invention, the term "laminate" includes artwork and transparent films that are both separated pieces and bonded pieces.

The cover layer (or laminate) includes a skirt portion that overhangs a free edge of the front plate. A formed back cover, which is usually made of steel, is placed against the metallic front plate in a manner that tucks the skirt of the cover layer around the free edge of the front plate, as would be conventionally understood in this art. The front plate is crimped around its free peripheral edge against an outer frusto-conical wall of the back cover, thereby forming a button shell, similar to a traditional button except here the present invention includes a permanent magnet placed inside the button shell.

The present invention can be made by adopting devices known in the existing art of traditional pin-backed novelty buttons. For example, Braunberger in U.S. Pat. No. 4,829,662 (issued May 16, 1989) describes a button press and method of assembling traditional novelty buttons (and this reference in its entirety is hereby incorporated by reference as if fully set out herein). Those skilled in the art will appreciate that such a device, with some modification to handle rare-earth magnets, as will be described herein below, can be adapted for use in the contemplated and preferred embodiments of the present invention.

As such, a button press includes an upper die assembly that is mounted for vertical movement on a support, an indexable turntable mounting a plurality of spaced, alternating forming die assemblies and crimping die assemblies that are positionable beneath the upper die assembly as the turntable is indexed, means for moving the upper die assembly toward and away from engagement with a respective lower die assembly, means for indexing the turntable through finite increments to place alternate ones of the lower dies beneath the upper die assembly, and a common drive that provides coordinated reciprocal motion of the upper die assembly and indexing of the turntable.

The means for indexing the turntable preferably includes an index wheel mounted on a shaft that mounts the turntable. The index wheel includes a plurality of spaced radial slots in its perimeter. A drive roller connected to the common drive is movable thereby through a conical path that intersects the perimeter of the index wheel to engage successive radial slots and to advance the index wheel one increment for each complete orbit of the drive roller.

The operator of a button press, in accordance with the present invention, loads components (details of these components are described herein, below) on the lower die assemblies on the turntable and thereby enable the components to be advanced underneath the upper die assembly as the turntable indexes. Completed buttons are removed by the same operator from the die assemblies after exiting from beneath the upper die assembly.

The button press uses a single electric motor to both index the turntable and drive the upper die assembly towards and away from the respective lower die assembly. The button press includes a control for the electric motor which allows continuous operation, or intermittent incremental operation, and which also includes safeguards to insure that the dies are in proper alignment before the upper die assembly engages a lower die assembly.

This well-known method of assembly novelty buttons works extremely well for novelty buttons having a flat backing plate, and for contoured backing plates, provided that those backing plates not include an internally mounted rare-earth magnet, for the reasons that will be explained below. Yet, the fundamental operation and elements of this device has been adapted for use for novelty buttons of the present invention.

One first improvement of the present invention is the use of aluminum and plastic for the die and press components and rotary table. By eliminating ferrous materials from the vicinity of the rare-earth magnets and any components used in the manufacturing and assembly of the novelty button, the present invention is able to adapt conventional novelty button manufacturing machines to work.

To appreciate certain aspects of the various preferred embodiments of the present invention, FIG. 1 illustrates the general components of a novelty button 10 in an exploded view. The components include a ferrous material used as the back cover 20, a rare-earth element magnet 30 inserts on an inside face of the back cover and is, therefore, sandwiched between the back cover 20 and the front plate 25. The front plate 25 further supports the art-layer 40. The art-layer 40 is typically a die-cut piece of paper that has printing 42 (text, graphics, color, or any combination). Finally, there is a cover layer 50 consisting of a transparent material. Once assembled, these pieces are inserted into a crimping press where they are pressed together with the cover layer 50 overwrapping the backing plate.

More particularly, the front plate 25 consists of a substantially circular plate having a peripheral edge. This plate 25 will be formed into a domed shell during a crimping operation. The peripheral edge extends further down than the front surface plate. The novelty button's back cover 20 has a substantially circular back surface plate with an associated peripheral edge extending further up than the back surface plate.

The front cover 25 engages with the back cover 20 so that the peripheral edge of the back cover and the peripheral edge of the front cover come into contact. The front cover and the back cover are fabricated from a malleable material, for example tin, or other alloys of steel, which is commonly used in this art and would be well-understood by those having ordinary skill.

The present invention contemplates a method of assembling a novelty button. The method includes preparing artwork as would be generally understood in this art, including the art of novelty pin-type buttons.

This method further includes preparing a novelty button for assembly. One step of the assembly is to place a permanent magnet 31 on the interior cavity formed between the underside of the top plate 25 and the inside of the back cover 20 of the novelty button.

Permanent magnets 30 are typically disc-shaped and come in long stacks, aligned to that the adjacent button's N pole touches the neighboring button's S pole. This makes manual separating of the magnets difficult and time consuming. So, the present invention contemplates a device that includes a first, indexable rotary table 60 having fixtures for receiving one magnet. The first rotary table is a non-ferrous material, such as hardened aluminum. The individual, bottommost magnet from the vertical stack gravity fed into a corresponding receiving cup 64 arranged on the first table. In one contemplated embodiment this receiving cup 64 is a recessed, half-spherical feature arranged below a top surface of an indexing tabletop. This recess feature of the receiving cup 64 cooperates with a shearing fixture 70 (described below) to enable a bottommost 33 magnet from the vertical stack of magnets to fall into the cup 64 when the receiving cup, by means of the first rotary table 60 indexing or advancing the cup 64 beneath the vertical stack of magnets. Then, as the first indexing table advances, the shearing fixture (described below) effectively slices the bottommost magnet 33 from the stack.

A mounting fixture 70 arranges relative to the first rotary table 60. The mounting fixture (also called a feeding tube) stabilizes the stack of magnets 30 and prevents the stack of magnets from being moved relative to the rotating table. The mounting fixture is configured to arrange the stack of magnets in a substantially vertical position and is further configured to align above the first rotary table whereby a bottommost magnet 33 is aligned with a receiving cup 64 on the rotary table.

The shearing fixture 70 is a magnetically inert (non-ferrous) material and defines a hole 76 for the stack of magnets to slideably insert. Gravity pulls the stack of magnets down, through the hole 76 on the shearing fixture. A close tolerance between the shearing fixture and the top of the first rotary table 60 ensures that the bottommost magnet 33 remains attached to stack of magnets 30 as the rotary table advances. But, when the rotary table positions a receiving cup 64 under the shearing fixture's hole 76, the bottommost magnet 33 falls into the cup by gravity, and the top of the bottommost magnet 33 is now below the bottom, leading edge 72 of the shearing fixture 70. Thus, as the first rotary table advances, the relative motion between the stationary shearing fixture and the rotary table combined with the downward movement of the stack of magnets caused by gravity and aided by the slicing movement of the shearing fixture relative to the stack of magnets, the bottommost magnet 33 falls into the cup 64.

As the first rotatory table 60 spins through its cycle, the particular receiving cup 64 containing the bottommost magnet 33 eventually returns to a position where the operator may remove the magnet from the receiving cup. The operator, or in alternative embodiments, a transfer machine, removes the magnet from the cup and then places the magnet on an awaiting back cover 20.

The subassembly combination, consisting of a magnet 30 and back cover 20, is then placed on a second rotary table 90 in a lower die fixture 94, which comprises a ferrous material, such as steel, to help fix and hold in place the subassembly. In a preferred embodiment, the lower die comprises a plurality of lower dies fixtures arranged on a hardened aluminum second rotary table that is indexable between at least a first position and a second position.

One example of known rotary table devices that can readily be modified for use with the present invention includes the rotary table described by Braunberger in U.S. Pat. No. 4,829,662 issued May 16, 1989, for example. However, in the present invention, this second rotary table is made from a magnetically inert (non-ferrous) material such as plastic or, preferably, aluminum. The back cover is placed in an aluminum lower die fixture located on the second rotary table. It will be appreciated in the art that steel is typically used as die material due to its durability in a manufacturing environment. Steel dies, however durable, are ferrous, and therefore ill-suited for assembly magnetic items, such as the rare-earth magnet's contemplated in the current invention.

The back cover 20 is arranged to the visible exterior side of the plate is down and the interior side or face is face up. The interior side is pre-assembled with a magnet (for example the bottommost magnet 33 from the first rotary table 60) and this subassembly combination is placed face up in the lower die fixture 94.

Next, the front plate 25 and a pre-cut artwork layer, such as paper 40 (a piece of graphic paper cut to a predetermined size) and transparent cover 50 each is placed on top of the magnet/plate sub-assembly. The second rotary table 90 advances this assembly to the upper die/press combination, which is fabricated or otherwise made from non-ferrous material such as hardened aluminum. And once the lower die loaded with the back cover and magnet sub assembly and with the front plate, artwork layer and transparent cover arranged thereon, aligns under the upper die and press, a top die tool presses down over the assembly creating the finished novelty button with a permanent magnet inserted inside.

To enable this above method, the present invention contemplates various devices. One such device is the magnet-separating (first) rotary table 60 as FIGS. 1, 2, 3, 4, and 7 illustrate. First, referring generally to FIG. 7, this first rotary table 60 sits on a work surface 80 and is indexed by motor 68, and can run either clockwise or anti-clockwise as would be well understood in this art. The speed and interval of rotation, as well as activating a start-stop of the rotation are well understood in this art. A mounting fixture 82 supports a fixture for holding the stack of magnets 30. This magnet-stack fixture includes an upper and lower support ring 86, which couples to the fixture 82 by a corresponding arm 84. A shearing fixture 70 is positioned above the rotating table so that the stack of magnets 30 inserts in hole 76 on the shearing fixture to allow the stack to come into contact with the rotating table.

Now referencing FIGS. 1, 2, 3, and 4, details of these aforementioned elements are further discussed. The rotating table 60 includes one or more receiving cups or fixtures 64 sized to receive a single magnet 31 from the stack of magnets 30. This fixture is a receiving cup 64 having a bottom surface that is below the top surface 62 of the rotating table 60, which is a non-ferrous material, such as aluminum. Gravity feeds magnets 30 toward the table 60 ensure that the bottommost magnet 33 in the stack reaches the bottom surface of the indented cup 64.

The shearing fixture 70 is made from a non-ferrous material, such as aluminum or nylon (or other non-ferrous, plastic-like material), and includes a hole 76 for the stack of magnets to fit slideably therethrough. One portion 72 of the shearing fixture allows some clearance between the bottom of the shearing fixture and the top of the table 62. The shearing fixture is held stationary relative to the table 60. Thus, as the table moves (in this view of FIG. 4, anti-clockwise), the magnet slides downward, contacting the smooth top surface of the table. The table continues to move and the indented cup 64 then aligns under the hole 76, thus enabling the entire stack of magnets 30 to move downward. The table continues to advance relative to the shearing fixture, thus scraping the bottom magnet from the stack.

Figure 5:
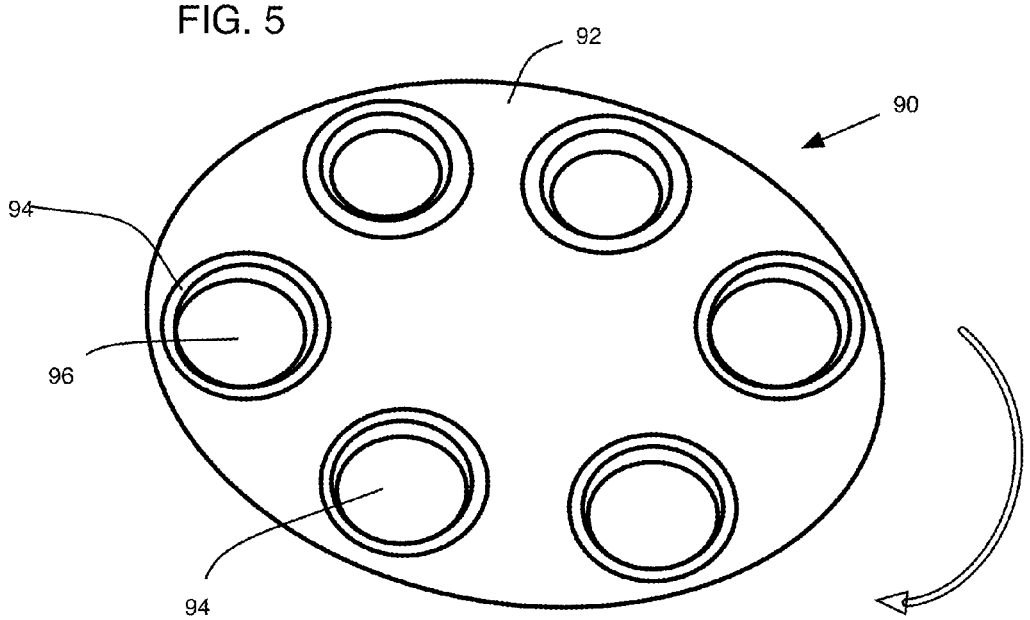
FIG. 5 is an offset frontal view of a device for pressing together the components of the novelty button of FIG. 1 according to a preferred embodiment of the present invention.

FIG. 5 shows a second rotary table 90, which in operation is very similar to the first rotary table, as would be well understood by those skilled in this art. One important feature of this second rotary table 90 is that it is made from non-ferrous material, such as hardened aluminum. The smooth, flat top surface 92 includes one or more fixtures, or lower die set 94 having a bottom surface 96, which is made from aluminum or other similar non-ferrous material. This lower die set is sized to receive the sub-assembly consisting of the metal back cover with permanent earth magnet pre-assembled. The table 90 indexes or rotates to position the components of the novelty button under a conventional upper die, made from aluminum, which conventionally operates to press the components of the novelty button into a final assembly consisting of a clear top sheet of plastic, the artwork, and the back cover containing a rare earth magnet inside the cavity of the button back, is picked up from the rotary magnet separation device. These various components are placed into the lower die 94 having a bottom surface 96 by conventional means such as a hand operation or by an automated system, as would be understood in the art. Both the lower die 94 and bottom surface 96 comprise a ferrous material, such as tool steel or similar, which helps secure the subassembly during various operations.

Figure 6:
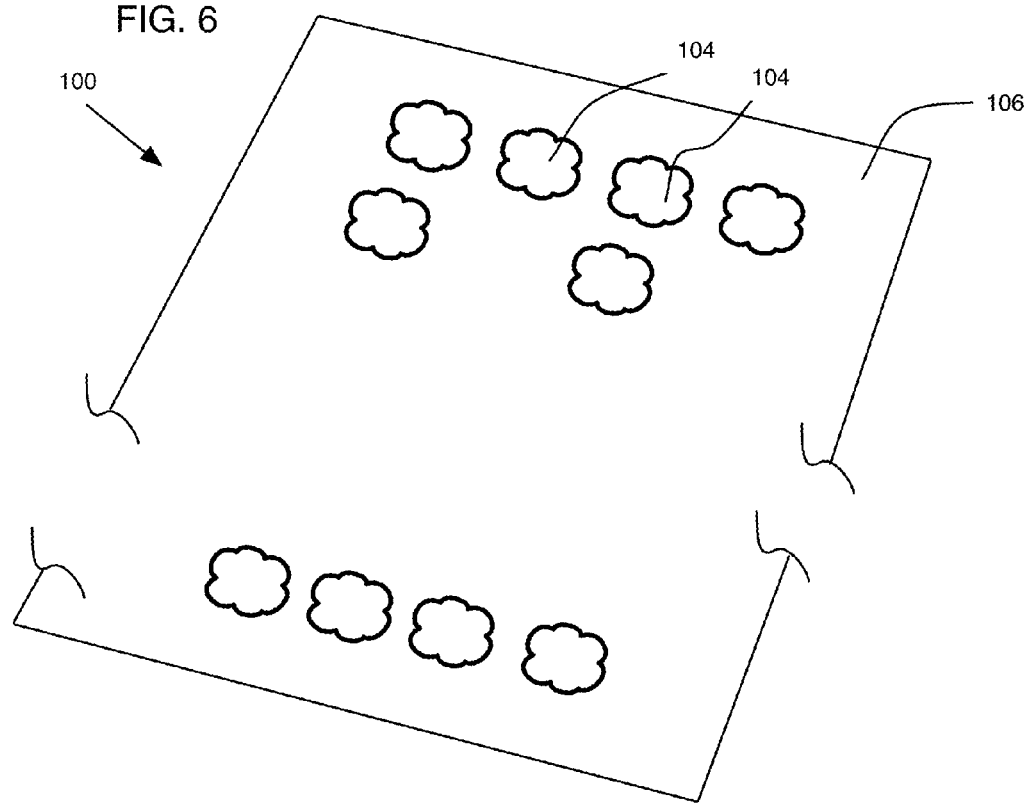
FIG. 6 is an offset frontal view of a sheet of images on a paper medium prior to a cutting operation; the images are assembled into the novelty button of FIG. 1.
Figure 7:
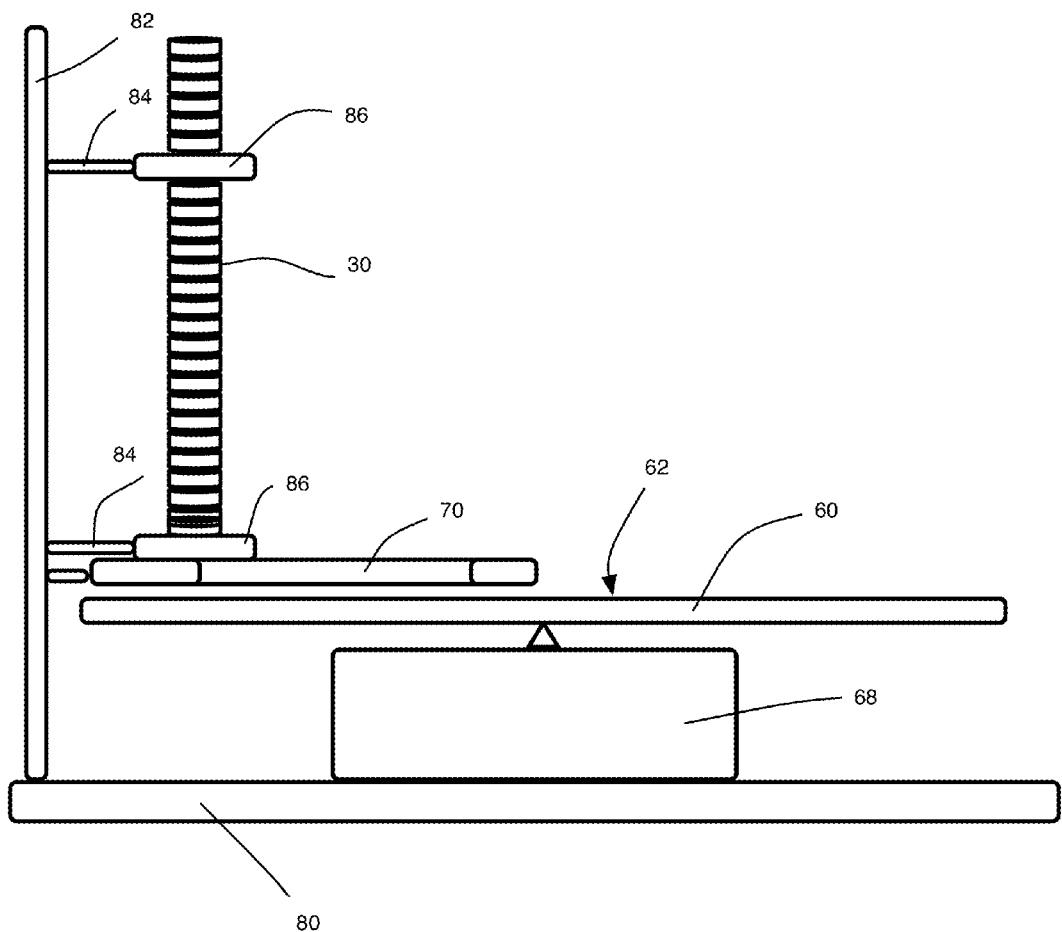
FIG. 7 is a side view of a device for separating permanent magnets from a stack of magnets according to a preferred embodiment of the present invention.

FIG. 6 shows a sheet of paper 100, such as 28 lb bond paper 106, transparency film, or other printable media pre-printed (or otherwise transferred, imprinted, placed, drawn, sketched, written, painted, etc.) with artwork 104 from any known printing means.

One preferred and contemplated embodiment of the present invention and as illustrated in FIGS. 1-7 includes a system for assembling a novelty button having a permanent earth magnet 31 inserted internally. The system comprises a first rotary table 60 having one or more indentions below the surface wherein each receiving cup 64 is sized to receive one magnet 31 from a stack of magnets 30; a stationary shearing fixture 70 made from a non-ferrous material positions over the first rotary table and is adapted to remove a bottommost magnet 33 from the stack when the first table rotates. Further, disposed adjacent to the first rotary table, a second rotary table 90—made from a non-ferrous material having at least one ferrous lower die fixture 94 having a bottom surface 96 that is adapted to receive a subassembly consisting of a back cover 20 and a permanent earth magnet 31 arranged on the interior cavity of the backing plate—includes a modified button press disposed in relation to the second rotary table so that the lower die fixture arranges under an upper die fixture presented by the press. Although the press is significantly conventional, the primary modification is that the upper die fixture is constructed (fabricated, machined, or otherwise configured) from a non-ferrous material, such as hardened aluminum, and is adapted to crimp a top plate 25 and intermediate artwork to a back cover 20. The crimping of the top plate to the back cover is conventional.

One contemplated and preferred method of the present invention includes the system and device of FIGS. 1-7, as described above, and further this method is for assembling a novelty button having a permanent earth magnet inserted internally. The method includes the steps comprising providing the devices described herein; providing artwork cut to size; preparing a novelty button for assembly; placing a permanent magnet on the interior cavity of the back cover of the novelty button; stacking a plurality of magnets and placing the stack in a fixture to present the stack to a rotary table having fixtures for receiving one magnet; providing a shearing fixture arranged over the rotary table, the rotary table is a non-ferrous material so the individual magnet is attracted to the corresponding fixture and the shearing fixture is a magnetically inert material having a hole for the stack of magnets to insert; rotating the table relative to the shearing fixture so that the relative motion between the stationary shearing fixture and the rotary table combined with the downward movement of the stack of magnets caused by gravity and the attraction of the magnets to the rotary table thus resulting in one magnet being "sliced" off the stack of magnets; removing the individual magnet from the rotary table and placing the magnet on a backing plate; placing the combination of a magnet and back cover on a second rotary table made from a magnetically inert material having one or more lower die fixtures; arranging the back cover so that the visible exterior side of the plate is down and the interior cavity having the magnet is face up; placing pre-cut artwork over the magnet; placing a clear plastic cover over the artwork; indexing the table; and pressing the clear plastic cover, the artwork, and the back cover with magnet in a conventional manner.

One contemplated rare-earth (or permanent) magnet comprises a material known in the art as neodymium. Magnets are readily available in a ⅜-inch by ⅛-inch size from a myriad of sources will understood in this art. Other sizes would work as well. The front plate 25 and back cover 20 are well-understood in the art and include tin plated steel or nickel coated steel, for example.

Figure 11:
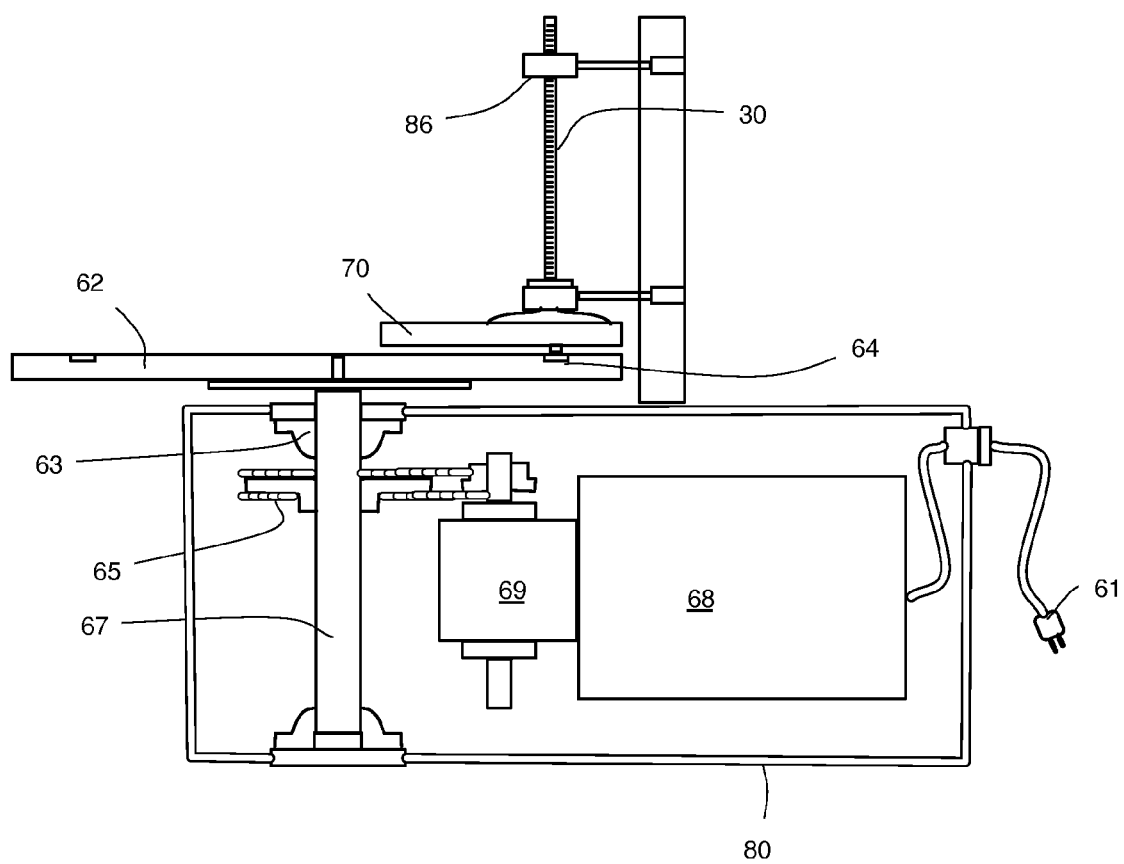
FIG. 11 is a front view of a system incorporating the device of the present invention.

FIG. 11 illustrates several components of a system using the first rotary table 60 according to one preferred embodiment of the present invention. The tabletop 62 is supported by a driveshaft 67, which is driven by a chain 65 on a 2:1 reduction gear driven by a gearbox 59. An electric motor 68 with a foot-pedal controller (not shown in the drawing) couples to the gearbox I a conventional manner. The electric motor is a 110-volt motor and uses a standard outlet plug 61. The vertical stack of magnets 30 arranges above the shearing fixture 70 and above at least one of the receiving cups 64. The table can index clockwise or counterclockwise. A holding fixture 80 supports the magnets in the desired location relative to the table.

Figure 8:
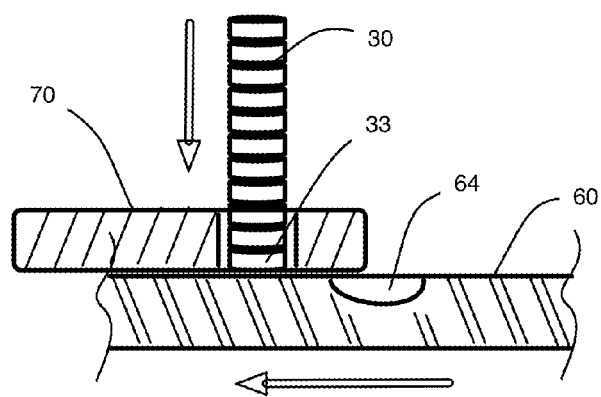
FIG. 8 is a partial front cross sectional view illustrating one step in a preferred method of the present invention and shows a vertical stack of magnets, a first rotary table, and a shearing fixture.
Figure 9:
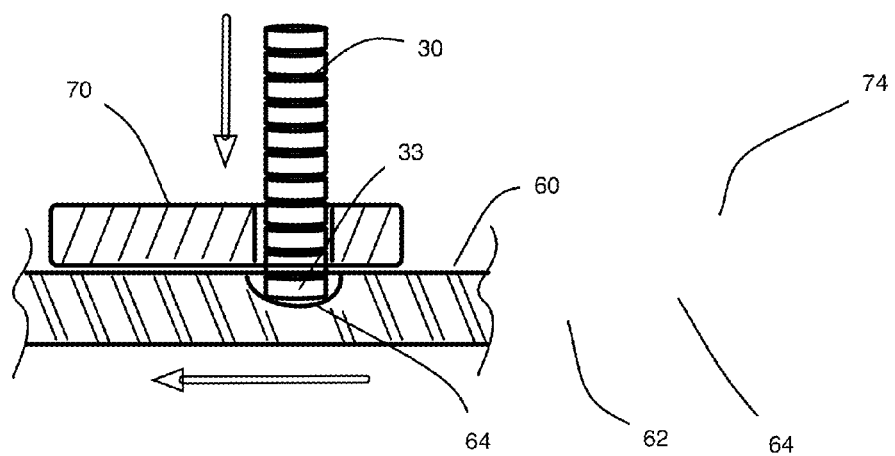
FIG. 9 is a partial front cross sectional view illustrating another step in the method of FIG. 8.
Figure 10:
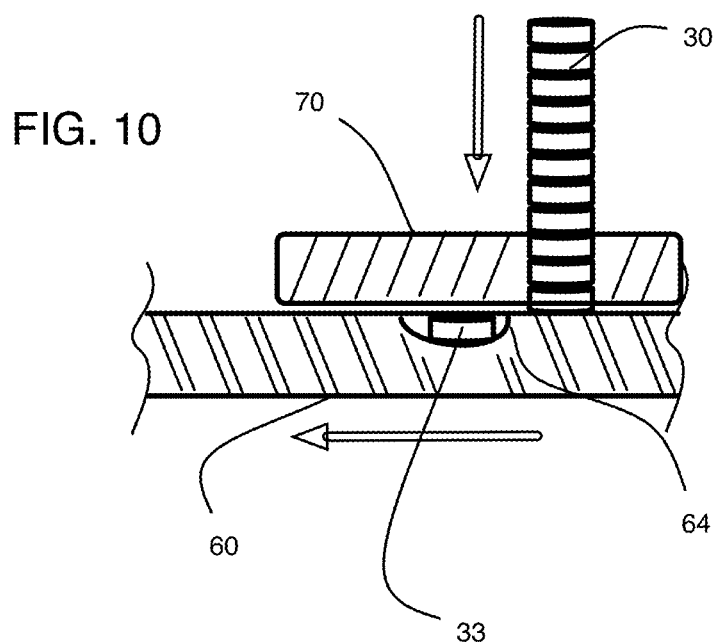
FIG. 10 is a partial front cross sectional view illustrating yet another step in the method of FIG. 8.

Another preferred method of the present invention includes utilizing the device of FIGS. 1-7 and details of this method are illustrated by FIGS. 8-10, for example. This method for assembling a novelty button includes the steps of providing a plurality of rare-earth magnets arranged in a vertical stack 30, at least one front plate 25, at least one back cover 20, at least one artwork layer 40, and at least one transparent cover 50. Providing a mounting fixture 80 and arranging the plurality of rare-earth magnets therein. Providing a first rotary table 60 comprising a non-ferrous material and further comprising a plurality of receiving cups 64 adapted to receive one magnet 31 for each of the plurality of receiving cups. Arranging the mounting fixture 80 over the first rotary table 60 whereby indexing the rotary table aligns one of the plurality of receiving cups 64 beneath the stack 30. Providing a shearing fixture 70 arranged over the first rotary table 60 and beneath the stack 30: The shearing fixture comprising a non-ferrous material and defining a hole 76 for the stack of magnets 30 to fit slideably therethrough. Holding the shearing fixture stationary relative to indexable motion of the first rotary table. Indexing the first rotary table so that one of the plurality of receiving cups aligns under the hole of the shearing fixture thus enabling the stack of magnets to slide downward through the hole and a bottommost magnet 33 from the plurality of magnets falls into the receiving cup. And, advancing the first rotary table so that the one of the plurality of receiving cups, now having the bottommost magnet therein, advances past the hole of the shearing fixture thereby slicing the bottommost magnet from the stack.

This method further includes removing the bottommost magnet 33 now sitting in the one of the plurality of receiving cups 64 and placing the bottommost magnet against the back cover 20. Placing the back cover with the magnet in a lower die 94, the lower die being disposed on a second rotary table 90. The second rotary table comprising a non-ferrous material. Arranging the transparent cover 50, the artwork layer 40, and the front plate 25 over the back cover having the magnet attracted to an inside face of the back cover. Advancing the second rotary table so that the lower die aligns with an upper die. And, crimping the transparent cover, the artwork layer, and the front plate to the back cover thus encapsulating the bottommost magnet.

Although the invention has been particularly shown and described with reference to certain embodiments, it will be understood by those skilled in the art that various changes in form and detail may be made without departing from the spirit and scope of the invention. And, although claims are not required, I claim at least:

I claim:

1. A method for assembling a novelty button, the method comprising:
    providing a plurality of rare-earth magnets arranged in a vertical stack, at least one front plate, at least one back cover, at least one artwork layer, and at least one transparent cover;
    providing a mounting fixture and arranging the plurality of rare-earth magnets therein;
    providing a first rotary table comprising a non-ferrous material and further comprising a plurality of receiving cups adapted to receive one magnet for each of the plurality of receiving cups;
    arranging the mounting fixture over the first rotary table whereby indexing the rotary table aligns one of the plurality of receiving cups beneath the stack;
    providing a shearing fixture arranged over the first rotary table and beneath the stack, the shearing fixture comprising a non-ferrous material and defining a hole for the stack of magnets to fit slideably therethrough;
    holding the shearing fixture stationary relative to indexable motion of the first rotary table;
    indexing the first rotary table so that one of the plurality of receiving cups aligns under the hole of the shearing fixture thus enabling the stack of magnets to slide downward through the hole and a bottommost magnet from the plurality of magnets falls into the receiving cup; and
    advancing the first rotary table so that the one of the plurality of receiving cups, now having the bottommost magnet therein, advances past the hole of the shearing fixture thereby slicing the bottommost magnet from the stack.

2. The method of claim 1 further comprising:
    removing the bottommost magnet now sitting in the one of the plurality of receiving cups and placing the bottommost magnet against the back cover;
    placing the back cover in a lower die, the lower die being disposed on a second rotary table, the second rotary table comprising a non-ferrous material;
    arranging the transparent cover, the artwork layer, and the front plate over the back cover;
    advancing the second rotary table so that the lower die aligns with an upper die; and
    crimping the transparent cover, the artwork layer, and the front plate to the back cover thus encapsulating the bottommost magnet.

3. A device for assembling a novelty button with a magnet arranged between a front plate and a back cover, the device comprising:
    a first rotary table comprising at least one receiving cup arranged on the table so that a top surface of the table is above a bottom surface of the receiving cup, and wherein the first rotary table comprises a non-ferrous material, the first rotary table further being indexable from a first position to a second position;
    a shearing fixture comprising a non-ferrous material, the shearing fixture defining a hole;
    a mounting fixture adapted to receive a plurality of vertically stacked magnets, the mounting fixture arranged above the hole on the shearing fixture and wherein the vertically stacked magnets are gravity fed through the hole;
    and wherein when the first rotary table indexes from the first position to the second position, the at least one receiving cup aligns under the hole of the shearing fixture whereby a bottommost magnet from the plurality of vertically stacked magnets is gravity fed into the at least one receiving cup whereby magnetic attraction between the receiving cup and the bottommost magnet engages the bottommost magnet against the receiving cup.

4. The device of claim 3 further comprising:
    a second rotary table operable between a first and second position, the second rotary table comprising a non-ferrous material, the second rotary table further comprising at least one lower die adapted to selectively receive the back cover;
    a crimping die arranged above the second rotary table whereby indexing of the second rotary table from the first position to the second position aligns the crimping die above the at lest one lower die, the crimping die operable to crimp the front plate to the back cover.

5. The device of claim 4 further comprising:
    a transfer mechanism operably arranged to remove the bottommost magnet from the first rotary table and insert the bottommost magnet on an interior face of the back cover.

* * * * *